United States Patent
Nguyen

(12) 
(10) Patent No.: US 6,377,978 B1
(45) Date of Patent: Apr. 23, 2002

(54) DYNAMIC DOWNLOADING OF HYPERTEXT ELECTRONIC MAIL MESSAGES

(75) Inventor: Julien Tan Nguyen, Redwood City, CA (US)

(73) Assignee: Planetweb, Inc., Redwood Shores, CA (US)

(*) Notice: Subject to any disclaimer, the term of this patent is extended or adjusted under 35 U.S.C. 154(b) by 0 days.

(21) Appl. No.: 08/716,641

(22) Filed: Sep. 13, 1996

(51) Int. Cl.[7] .............................................. G06F 15/16
(52) U.S. Cl. ...................................... 709/206; 709/207
(58) Field of Search ...................... 395/200.36, 200.37; 79/206, 207

(56) References Cited

U.S. PATENT DOCUMENTS

| | | | |
|---|---|---|---|
| 5,204,947 A | | 4/1993 | Bernstein .................... 345/854 |
| 5,377,354 A | * | 12/1994 | Scannell et al. ............. 395/650 |
| 5,499,109 A | * | 3/1996 | Mathur et al. ............... 358/400 |
| 5,508,817 A | * | 4/1996 | Kunigami .................... 358/402 |
| 5,513,126 A | * | 4/1996 | Harkins et al. .............. 364/514 |
| 5,548,789 A | * | 8/1996 | Nakanura .................... 395/853 |
| 5,572,643 A | | 11/1996 | Judson ........................ 345/418 |
| 5,574,843 A | | 11/1996 | Gerlach, Jr. ................. 382/152 |
| 5,619,648 A | * | 4/1997 | Canale et al. .............. 395/200.1 |
| 5,623,503 A | | 4/1997 | Jiang et al. .................. 709/207 |
| 5,623,603 A | * | 4/1997 | Jiang et al. ................. 395/20.4 |
| 5,627,764 A | * | 5/1997 | Schutzman et al. ......... 364/514 |
| 5,630,060 A | | 5/1997 | Tang et al. .................. 709/238 |
| 5,666,542 A | | 9/1997 | Mitsuyoshi et al. ........ 395/762 |
| 5,675,507 A | * | 10/1997 | Bobo, II ...................... 364/514 |
| 5,680,619 A | | 10/1997 | Gudmundson .............. 217/108 |
| 5,694,163 A | | 12/1997 | Harrison ...................... 725/110 |
| 5,705,502 A | | 1/1998 | Foley et al. ................. 514/275 |
| 5,706,502 A | | 1/1998 | Foley et al. ................. 707/10 |
| 5,710,863 A | | 1/1998 | Hong et al. ................. 709/246 |
| 5,710,883 A | * | 1/1998 | Hong et al. ............. 395/200.17 |
| 5,724,574 A | * | 3/1998 | Stratigos et al. ............. 369/610 |

(List continued on next page.)

OTHER PUBLICATIONS

Brown, Mark; Using Netscape 2, pp 327–375, 1995.*
Chung–Ming Huang Et Al: "Multimedia E–Mail: The Evolution Approach Based on Adapters" Software Practice & Experience vol. 24, No. 9, Sep. 1, 1994, pp. 785–800, XP000655471 ISSN: 0038–644 pp. 794, line 3—p. 797, Line 2; figures 11, 12.
Ouhyoung M Et Al: "The MOS Multimedia E–Mail System" Proceedings of the International Conference on Multimedia Computing and Systems, May 19, 1994, pp. 315–324, XP002073636, p. 315, right–hand col., line 21—p. 319, left–hand column, line 3; figure 1,2; table 1.

(List continued on next page.)

Primary Examiner—Glenton B. Burgess
Assistant Examiner—Kenneth W. Fields
(74) Attorney, Agent, or Firm—Swernofsky Law Group

(57) ABSTRACT

The invention provides a method and system for dynamic downloading of hypertext electronic mail messages. The system includes a mail server for receiving electronic mail messages and their headers, and a mail client for downloading electronic mail messages and their headers from the mail receiver and presenting downloaded electronic mail messages and headers to an operator. The mail client dynamically downloads and presents electronic mail messages responsive to interactive instructions from an operator, preloads and stores electronic mail messages for subsequent presentation to the operator, and organizes electronic mail messages in hypertext sections for selection by and presentation to the operator. The mail server and the mail client cooperate dynamically and interactively to download, so as to present to the operator, electronic mail messages, or portions thereof, linked by hypertext links and possibly including data, audiovisual material, included programs, security features, or other features in addition to text.

16 Claims, 1 Drawing Sheet

U.S. PATENT DOCUMENTS

| | | | |
|---|---|---|---|
| 5,734,835 A | 3/1998 | Selker | 709/249 |
| 5,737,519 A | 4/1998 | Judson | 707/500 |
| 5,737,599 A | 4/1998 | Rowe et al. | 707/10 |
| 5,754,235 A | 5/1998 | Hum et al. | 345/428 |
| 5,754,700 A | 5/1998 | Kuzma | 382/236 |
| 5,754,765 A | 5/1998 | Danneels et al. | 709/222 |
| 5,754,851 A | 5/1998 | Wissner | 707/104.1 |
| 5,761,673 A | 6/1998 | Bookman et al. | 709/311 |
| 5,764,235 A | 6/1998 | Hunt et al. | 345/428 |
| 5,768,505 A | 6/1998 | Gilchrist et al. | 707/502 |
| 5,781,741 A * | 7/1998 | Imamura et al. | 395/200.66 |
| 5,781,785 A | 7/1998 | Rowe et al. | 707/311 |
| 5,784,058 A | 7/1998 | LaStrange | 345/738 |
| 5,787,470 A | 7/1998 | DeSimone et al. | 345/738 |
| 5,794,039 A | 8/1998 | Guck | 707/10 |
| 5,794,259 A * | 8/1998 | Kikinis | 707/507 |
| 5,809,512 A | 9/1998 | Kato | 709/201 |
| 5,816,435 A | 10/1998 | Kozuka | 707/507 |
| 5,818,447 A | 10/1998 | Wolf et al. | 345/752 |
| 5,826,102 A | 10/1998 | Escobar | 707/500.1 |
| 5,828,839 A | 10/1998 | Moncreiff | 709/204 |
| 5,835,683 A | 11/1998 | Corella et al. | 706/59 |
| 5,842,020 A | 11/1998 | Faustini | 717/111 |
| 5,845,299 A | 12/1998 | Arora et al. | 707/513 |
| 5,848,415 A | 12/1998 | Guck | 707/10 |
| 5,850,446 A | 12/1998 | Berger et al. | 705/79 |
| 5,854,299 A | 12/1998 | Arora et al. | 707/513 |
| 5,854,893 A | 12/1998 | Ludwig et al. | 709/204 |
| 5,870,544 A | 2/1999 | Curtis | 713/201 |
| 5,875,322 A | 2/1999 | House et al. | 712/220 |
| 5,878,223 A | 3/1999 | Becker et al. | 709/223 |
| 5,911,776 A | 6/1999 | Guck | 709/217 |
| 5,956,491 A | 9/1999 | Marks | 709/250 |
| 5,963,217 A | 10/1999 | Grayson | 345/474 |
| 5,995,093 A | 11/1999 | Lambourne | 345/716 |
| 6,014,688 A | 1/2000 | Venkatreman | 709/206 |
| 6,029,164 A | 2/2000 | Birrell et al. | 707/3 |

OTHER PUBLICATIONS

Anonymous: Graphical Command Line "IBM Technical Disclosure Bulletin", vol. 32, No. 8B, pp. 313–314, XP002109975 New York, US the whole document.

Anonymous: "Editing Word Processor Documents" IBM Technical Disclosure Bulletin, vol. 40, No. 7, pp. 187–188, XP002109976 New York, US.

Blumfield, Julie R. et al "Step–By–Step to a World–Class Web Site". Windows Magazine, Jul. 1995. vol. 06. No. 08.

Brown, March H. & Robert A. Shillner. "A New Paradigm for Browsing the Web". Mar. 7–11, 1995.

Graham, Malcolm & Andrew Surray. "Webbed Documents". pp.: 58–62. Dated: Oct. 1995.

Tessier, Tom. "Using JavaScript to Create Interactive Web Pages". Dr. Dobb's Journal on CD–ROM.

Using Netscape 2–Special Edition.

* cited by examiner

DYNAMIC DOWNLOADING OF HYPERTEXT ELECTRONIC MAIL MESSAGES

BACKGROUND OF THE INVENTION

1. Field of the Invention

This invention relates to dynamic downloading of hypertext electronic mail messages.

2. Description of Related Art

Electronic mail is a technique in which messages are composed by a sender, sent from a sending computer, received and stored at a receiving computer, and ultimately presented to a recipient; the sending computer and the receiving computer may be the same computer, or may be different computers which are coupled together using a computer network or other communication link. For example, an operator may use a workstation for composing electronic mail messages and to couple that workstation to the sending computer for sending those electronic mail messages, and to couple the workstation to the receiving computer for receiving electronic mail messages and to use the workstation for reviewing those electronic mail messages.

One problem which has arisen in the art is that it can take substantial time to transmit an electronic mail message from the workstation to the sending computer (herein called "uploading" the message) or to transmit an electronic mail message from the receiving computer to the workstation (herein called "downloading" the message). This problem is particularly acute when the electronic mail message is laden with data or graphics, when the communication link (between the workstation and the sending computer or between the workstation and the receiving computer) has relatively low communication bandwidth, or when there are many electronic mail messages to be transmitted. The operator of the workstation perceives substantial transmission time as excessive latency in uploading or downloading electronic mail messages.

One method has been to transmit only a part of the electronic mail message for presentation to the operator, such as a header for the message or a first screen display for the message, and to require the operator to request more of the electronic mail message before the remainder is transmitted for presentation. Although this method allows the operator to review at least part of the electronic mail message relatively quickly, it suffers from the drawback that the operator must be present at the workstation to request further information and thus to cause the electronic mail message to be fully transmitted for presentation.

A variant of this method is to transmit the entire electronic mail message for immediate presentation to the operator, but to allow the operator to interrupt the transfer, such as with a flow control character, if it is desired to perform another task. Although this method also allows the operator to review at least part of the electronic mail message relatively quickly, it suffers from the drawback that the operator must review only a single electronic mail message at a time, and therefore must wait the full latency for downloading a first electronic mail message before reviewing any part of a second electronic mail message.

An aspect of the problem which has arisen in the art is that electronic mail messages are linear sequences of characters, while it is often desirable to transmit information which is organized other than linearly. For example, it is often desirable to transmit information organized as hypertext, such as information presented using HTML (hypertext markup language) or related description languages, and capable of being transmitted using the HTTP (hypertext transfer protocol) or related protocols. When information is so organized, presenting information in the electronic mail message in the order it is transmitted will often be contrary to the purposes of the both the sender and recipient. Rather, the operator will wish to review portions of the electronic mail message in a different order from the order it is transmitted by the sender to the recipient.

Accordingly, it would be advantageous to provide a tecnique for downloading electronic mail messages which allows an operator to review at least portions of those electronic mail messages without waiting to download the entire electronic mail message. This advantage is achieved by a method and system according to the present invention in which electronic mail messages and portions thereof are presented to an operator at a workstation while other electronic mail messages or other portions of the same electronic mail message are dynamically downloaded in one or more background tasks and held in storage for later presentation.

SUMMARY OF THE INVENTION

The invention provides a method and system for dynamic downloading of hypertext electronic mail messages. The system includes a mail server for receiving electronic mail messages and their headers, and a mail client for downloading electronic mail messages and their headers from the mail receiver and presenting downloaded electronic mail messages and headers to an operator. The mail client dynamically downloads and presents electronic mail messages responsive to interactive instructions from an operator, downloads and stores electronic mail messages for subsequent presentation to the operator, and organizes electronic mail messages in hypertext sections for selection by and presentation to the operator. In preferred embodiments, the mail server and the mail client cooperate dynamically and interactively to download, so as to present to the operator, electronic mail messages, or portions thereof, linked by hypertext links and possibly including data, audiovisual material, included programs, security features, or other features in addition to text.

DESCRIPTION OF THE PREFERRED EMBODIMENT

Figure 1:
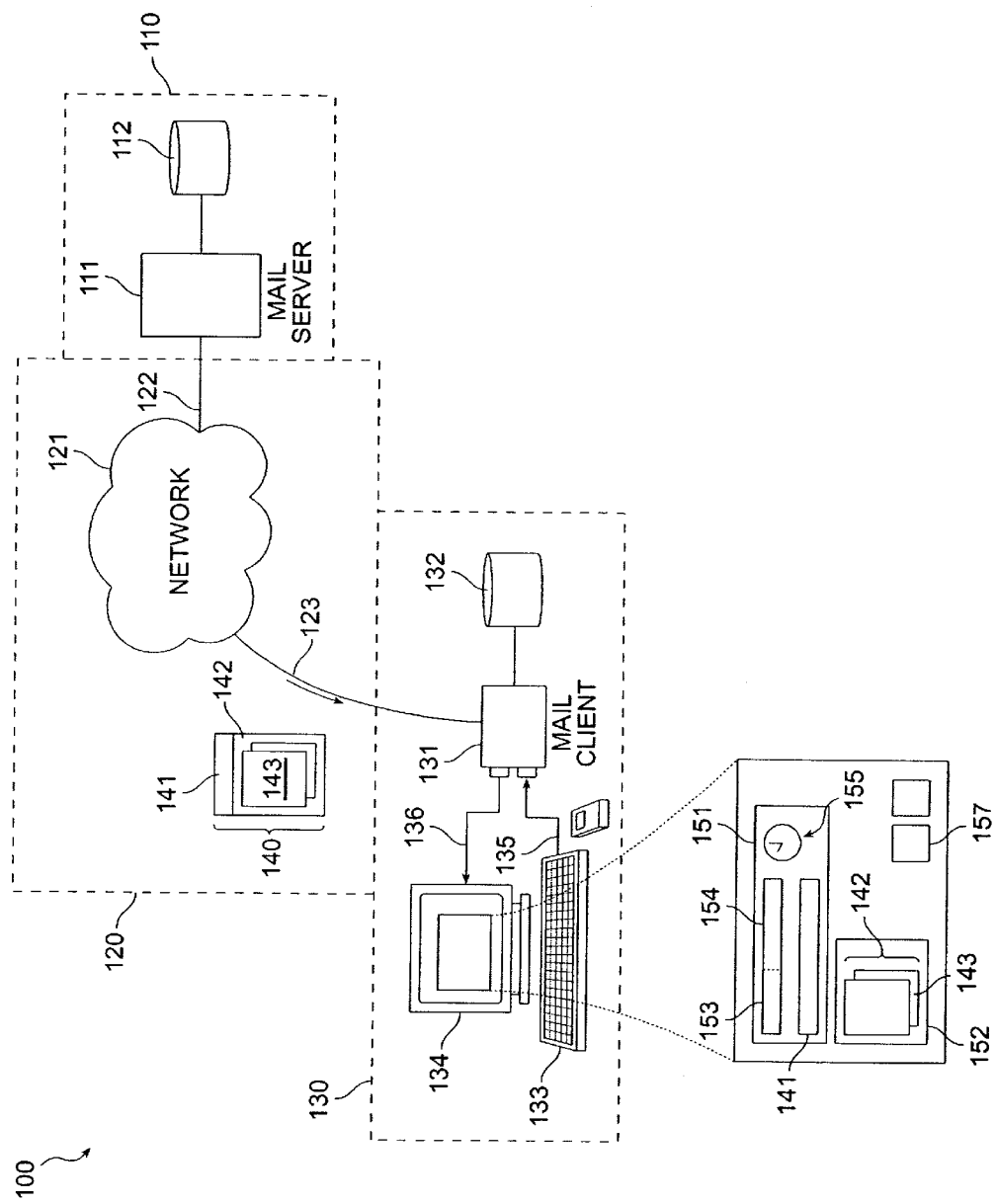
FIG. 1 shows a system for accessing electronic mail messages.

Embodiments of this invention may be used together with inventions described in the following co-pending application, hereby incorporated by reference as if fully set forth herein:

application Ser. No. 08/712,586, filed Sep. 13, 1996, in the name of inventor Julien T. Nguyen, titled "Dynamic Preloading of Web Pages", attorney docket number MWEB-001, assigned to the same assignee.

In the following description, a preferred embodiment of the invention is described with regard to preferred process steps and data structures. However, those skilled in the art would recognize, after perusal of this application, that embodiments of the invention may be implemented using a general purpose processor, and that modification of a general purpose processor to implement the process steps and data structures described herein would not require undue invention.

SYSTEM FOR ACCESSING ELECTRONIC MAIL MESSAGES

FIG. 1 shows a system for accessing electronic mail messages.

A system 100 for accessing electronic mail messages comprises a mail server 110, a communication link 120, and a mail client 130.

In a preferred embodiment, the mail server 110 comprises a server processor 111 and server storage 112, with the processor 111 comprising at least one general purpose computer having a computing element, program and data memory.

The mail server 110 is disposed for receiving electronic mail messages, and for generating and responding to requests from the mail client 130 in a protocol for transmitting electronic mail messages to the mail client 130. The protocol is preferably the Simple Mail Transfer Protocol ("SMTP"), but the concepts of the invention are broad enough to apply to other electronic mail protocols and protocols for transferring and presenting information.

In a preferred embodiment, the communication link 120 comprises a dynamic link using a network 121 (such as a local area network or a wide area network) or a network of networks (such as an "internet" or an "intranet"). The mail server 110 is coupled to the network using a server local link 122, such as a T1 line or other telephone line; similarly, the mail client 130 is coupled to the network using a client local link 123, such as a telephone line and a modem such as an ISDN modem or a 28.8 Kbps analog modem. Other techniques for coupling the mail server 110 and the mail client 130 to the network 121 are known in the art.

The mail client 130 similarly comprises a processor 131 and client storage 132, with the processor 111 comprising a general purpose processor having a computing element, program and data memory. In a preferred embodiment, preferred process steps and data structures for the page client 130 are specified in the the "Java" computer language. The general purpose processor may comprise any processor disposed to interpret or to compile the "Java" computer language, such as an Intel "Pentium" processor operating at 90 megahertz, having 32 megabytes of program/data memory, operating under control of the Microsoft "Windows 95" operating system, and coupled to 1.0 gigabytes of client storage 132.

In a first preferred embodiment, the mail client 130 comprises an input element 133 and a display element 134. The input element 133 comprises a keyboard and a pointing device such as a mouse or trackball. The display element 134 comprises a visual display element such as a monitor or a display panel, and an audio display element such as a speaker.

In a second preferred embodiment, the mail client 130 does not include both the input element 133 and the display element 134, but is disposed for coupling to devices for performing those functions and which are supplied by an operator. For example, the mail client 130 may comprise an input port 135 disposed for coupling to the input element 133, an output port 136 disposed for coupling to the display element 134, or both.

The operator may be a human being directing the operations of the mail client 130, or alternatively may be another program using the mail client 130 to obtain information from the mail server 110.

DYNAMIC DOWNLOADING OF HYPERTEXT ELECTRONIC MAIL MESSAGES

An electronic mail message 140 comprises a header 141, comprising information about the electronic mail message 140, and a body 142, comprising information intended to be transmitted to the recipient of the electronic mail message 140.

In a preferred embodiment, the header 141 comprises an address for a sender of the electronic mail message 140, an address for at least one recipient of the message of the electronic mail message 140, an element describing the subject of the electronic mail message 140, and an element describing the size of the electronic mail message 140. In a preferred embodiment, the header 141 is no more than about 250 bytes in size.

The display element 134 comprises a header window 151 within which information from the headers 141 is presented to the operator, thus showing the number and nature of electronic mail messages 140 which have been received and are available for download.

The body 142 comprises a plurality of pages 143 of information to be presented to the operator, such as web pages as described in the "Dynamic Preloading of Web Pages" co-pending application referred to herein. The pages 143 are logically coupled using links as described therein. Thus, each electronic mail message 140 comprises a linked collection of pages 143, similar to a web site stored at a web page server for the World Wide Web.

In a preferred embodiment, each electronic mail message 140 may comprise links to actual web pages (i.e., web pages outside the collection of pages 143 comprising the electronic mail message 140 itself) stored at a web server or other server for accessing information. These actual web pages are accessed using the Hypertext Transfer Protocol ("HTTP"), or other protocols for transferring and presenting information, including protocols known as "FSP", "FTP", "Gopher", and variants thereof, protocols for access to a command interface such as "Telnet", "MUD", "MUSH", "MOO", and variants thereof, other protocols for accessing, transmitting, or presenting information, and programs making use of such protocols., such as "Archie", "Veronica", "Jughead", and the like.

In a preferred embodiment, each electronic mail message 140 may comprise links to application programs available at the mail client 130, such as using Object Linking and Embedding ("OLE"), or a similar technique. For example, the electronic mail message 140 may comprise an embedded spreadsheet and an OLE link to a spreadsheet program for viewing or modifying the embedded spreadsheet.

The display element 134 comprises at least one page window 152, each of which presents one of the pages 143 to the operator. Each page 143 is presented in like manner as web pages are presented in the "Dynamic Preloading of Web Pages" co-pending application referred to herein. For each page 143, data included in the page 143, including text, graphics, motion picture data, audio, or data in other formats, is presented to the operator within the page window 152, along with any links, virtual links, included programs, security restrictions, or other features described in the "Dynamic Preloading of Web Pages" co-pending application referred to herein.

It is one aspect of the invention that electronic mail messages 140 are presented to the operator in like manner as web pages are presented in the "Dynamic Preloading of Web Pages" co-pending application referred to herein. In this aspect, the header window 151 is treated similarly to a web page in which each header 141 is treated similarly to a link to a first page 143 of its associated body 142.

Thus, the operator may select one of the headers 141 so as to view its associated body 142, to which the mail client 130 responds by downloading that body 142 and presenting a first page 143 of that body 142.

Similarly to the preloading of web pages in the "Dynamic Preloading of Web Pages" co-pending application referred to herein, the mail client 130 downloads the associated body 142 for each electronic mail message 140 before its actual selection by the operator, so as to be able to present pages 143 from that body 142 by reference to the client storage 132 rather than having to download that body 142 and force the operator to wait during the download operation.

OPERATION OF THE MAIL CLIENT

The mail client 130 transmits a request to the mail server 110, requesting transmission of the headers 141 for any electronic mail messages 140 which have been received and are available for downloading. In a preferred embodiment, the mail client 130 transmits such a request when it is first invoked, at periodic times, and when the operator so requests (such as by using a button or command character).

The mail client 130 receives headers 141 from the mail server 110 and presents those headers 141 in the header window 151 to the operator.

Responsive to the headers 141, the mail client 130 selects individual electronic mail messages 140 and transmits requests to the mail server 110 to download those individual electronic mail messages 140. As the electronic mail messages 140 are downloaded, they are stored in the client storage 132. The mail client 130 selects a first electronic mail message 140 and presents that first electronic mail message 140 in the page window 152.

The mail client 130 selects for downloading and downloads individual electronic mail messages 140 in like manner as web pages are selected for preloading and preloaded in the "Dynamic Preloading of Web Pages" co-pending application referred to herein.

Thus, in a preferred embodiment, the mail client 130 selects an individual electronic mail message 140 for downloading, and transmits a request to the mail server 110 to download that individual electronic mail message 140.

When the operator selects a particular electronic mail message 140 for presentation, the mail client 130 determines if that particular electronic mail message 140 has been downloaded and is present in the client storage 132. If so, the mail client 130 presents that particular electronic mail message 140 from the client storage 132. If not, the mail client 130 transmits a request to the mail server 110 to download the newly selected electronic mail message 140, downloads the newly selected electronic mail message 140, and presents the newly selected electronic mail message 140 to the operator in the page window 152.

The selection by the operator of a particular electronic mail message 140 for presentation takes priority over other download operations. The mail client 130 interrupts any other download operation to conduct the download operation requested by the operator. Thus, the mail client 130 may interrupt downloading and presentation of the headers 141 in the header window 151, downloading of a different electronic mail message 140 selected for downloading by the mail client 130, or even downloading of a different electronic mail message 140 selected for downloading by the operator (but for which the operator has apparently decided is lower priority).

As the mail client 130 downloads the electronic mail message 140, it presents as much as possible of the electronic mail message 140 (such as a first page 143 of the electronic mail message 140) to the operator for dynamic review while the downloading operation is in progress.

When the downloading operation for the selected electronic mail message 140 is complete, the mail client 130 reverts to its behavior of downloading the headers 141 if they are not completely downloaded, and of selecting for downloading and downloading individual electronic mail messages 140 in like manner as web pages are selected for preloading and preloaded in the "Dynamic Preloading of Web Pages" co-pending application referred to herein.

Dynamic downloading of electronic mail messages 140 continues so long as there are electronic mail messages 140 available at the mail server 110 for which the operator is the intended destination.

PROGRESS INDICATOR

The mail client 130 presents the progress of downloading operations using a progress indicator 151, in like manner as the page client presents the progress of preloading operations for web pages.

Thus, in a preferred embodiment, the progress indicator 151 uses one or more of the following preferred embodiments:

The progress indicator 151 may include a text element or a graphics element, having a first part 153 and a second part 154, each having different colors, and altering the relative sizes of the first part 151 and the second part 152 as the download operation progresses. In this embodiment, the graphics element comprises a separate dot or small circle 155 associated with the header 141; or, the text element comprises the presentation of header 141 itself.

The progress indicator 151 may include a text element 156 or a graphics element shown outside the header window 151. In this embodiment, the text element 156 comprises a phrase such as "75% complete" for a downloading operation which was in fact 75% complete; the graphics element may comprise a thermometer graph representing the progress of the downloading operation.

The progress indicator 151 may include a "thumbnail" picture 157 (i.e., a copy of a page 143 of the electronic mail message 140 presented in miniature), presented at a location outside the header window 151. In this embodiment, the progress indicator 151 comprises a first part 153 and a second part 154, in which the first part 153 comprises a segment of the thumbnail picture 157 which presents information from a page 143 of the electronic mail message 140 as that electronic mail message 140 downloaded, and the second part 154 comprises a background color or other indicator that further data is yet to be downloaded. Thus the thumbnail picture 157 will fill the location for its presentation as the downloading operation progresses.

ORDERING ELECTRONIC MAIL MESSAGES FOR DYNAMIC DOWNLOADING

In a preferred embodiment, the mail client 130 dynamically orders the electronic mail messages 140 for downloading, and selects those electronic mail messages 140 for downloading which the mail client 130 dynamically considers should be downloaded first.

Since the operator is likely to ultimately desire to review all the electronic mail messages 140 which are received, the mail client 130 will, unless directed otherwise by the operator, download all the electronic mail messages 140 whose headers 141 are presented by the mail server 110.

Similarly to the "Dynamic Preloading of Web Pages" co-pending application referred to herein, the mail client 130 makes its selection responsive to one or more of the following factors: (1) the operator may explicitly select a particular electronic mail message 140 for downloading (e.g., while the operator reviews a different electronic mail message 140); (2) the operator may explicitly select a set of downloading preferences and priorities.

To explicitly select a particular electronic mail message 140 for downloading, the operator selects the electronic mail message 140 for downloading using the input element 133, such as by pointing to the associated header 141 or to its preloading indicator 151 and selecting the electronic mail message 140 for downloading.

If the operator selects a particular electronic mail message 140 for downloading, the selected electronic mail message 140 takes priority and is downloaded before other electronic mail messages 140 which might be downloaded for other reasons.

When the operator explicitly selects a set of downloading preferences and priorities, the mail client 130 receives the downloading preferences and their relative priorities from the operator, and stores the downloading preferences and their relative priorities in the client storage 132. When the mail client 130 receives the headers 141, it reviews the downloading preferences and their relative priorities, and downloads those electronic mail messages 140 which are indicated by the downloading preferences in the order of their relative priorities.

The downloading preferences select among those links 150 to electronic mail messages 140 responsive to one or more of the following factors:
   the sender of the electronic mail message 140;
   whether this recipient of the electronic mail message 140 is the only recipient or one of several recipients;
   a priority value set by the sender for the electronic mail message 140, such as "urgent" or "bulk mail";
   keywords in the header 141 or the body 142 of the electronic mail message 140; or
   the size of the electronic mail message 140.

SENDING ELECTRONIC MAIL MESSAGES

In a preferred embodiment, the mail client 130 receives information from the operator to compose electronic mail messages 140 (either new electronic mail messages 140 or in reply to electronic mail messages 140 which have been received). The mail client 130 presents outgoing electronic mail messages 140 which are being composed in an outgoing window 153.

When the operator indicates that the outgoing electronic mail messages 140 are complete, the mail client 130 records them in the client storage 132 and uploads them at the next time when there is no downloading operation in progress. However, the operator may direct the mail client 130 (e.g., using a command invoked using a button or a control character) to interrupt any downloading operation which is in progress and to send one or more of the outgoing electronic mail messages 140 immediately.

Alternative Embodiments

Although preferred embodiments are disclosed herein, many variations are possible which remain within the concept, scope, and spirit of the invention, and these variations would become clear to those skilled in the art after perusal of this application.

I claim:
1. A method for presenting electronic mail messages to an operator, including the steps of:
   loading a plurality of headers from a mail server, each one of said headers associated with an electronic mail message addressed to at least said operator, each of said plurality of headers loaded separately from its associated electronic mail message;
   receiving a dynamic selection of a first one of said electronic mail messages from said operator after at least one of said plurality of headers have been loaded and prior to said associated electronic mail message being loaded;
   presenting said first electronic mail message to said operator;
   identifying a second one of said electronic mail messages for preloading; and
   preloading said second electronic mail message for later presentation, without interrupting presentation of said first electronic mail message;
   wherein said step of identifying said second electronic mail message for preloading is responsive to a preference designated by said operator.

2. A method for presenting electronic mail messages to an operator, including the steps of:
   loading a plurality of headers from a mail server, each one of said headers associated with an electronic mail message addressed to at least said operator, each of said plurality of headers loaded separately from its associated electronic mail message;
   receiving a dynamic selection of a first one of said electronic mail messages from said operator after at least one of said plurality of headers have been loaded and prior to said associated electronic mail message being loaded;
   presenting said first electronic mail message to said operator;
   identifying a second one of said electronic mail messages for preloading; and
   preloading said second electronic mail message for later presentation, without interrupting presentation of said first electronic mail message;
   wherein said step of identifying said second electronic mail message for preloading is responsive to a sender of said second electronic mail message.

3. A method for presenting electronic mail messages to an operator, including the steps of:
   loading a plurality of headers from a mail server, each one of said headers associated with an electronic mail message addressed to at least said operator, each of said plurality of headers loaded separately from its associated electronic mail message;
   receiving a dynamic selection of a first one of said electronic mail messages from said operator after at least one of said plurality of headers have been loaded and prior to said associated electronic mail message being loaded;
   presenting said first electronic mail message to said operator;
   identifying a second one of said electronic mail messages for preloading; and
   preloading said second electronic mail message for later presentation, without interrupting presentation of said first electronic mail message;

wherein said step of identifying said second electronic mail message for preloading is responsive to a set of recipients of said second electronic mail message.

4. A method for presenting electronic mail messages to an operator, including the steps of:

loading a plurality of headers from a mail server, each one of said headers associated with an electronic mail message addressed to at least said operator, each of said plurality of headers loaded separately from its associated electronic mail message;

receiving a dynamic selection of a first one of said electronic mail messages from said operator after at least one of said plurality of headers have been loaded and prior to said associated electronic mail message being loaded;

presenting said first electronic mail message to said operator;

identifying a second one of said electronic mail messages for preloading; and preloading said second electronic mail message for later presentation, without interrupting presentation of said first electronic mail message;

wherein said step of identifying said second electronic mail message for preloading is responsive to a priority value for said second electronic mail message.

5. A method for presenting electronic mail messages to an operator, including the steps of:

loading a plurality of headers from a mail server, each one of said headers associated with an electronic mail message addressed to at least said operator, each of said plurality of headers loaded separately from its associated electronic mail message;

receiving a dynamic selection of a first one of said electronic mail messages from said operator after at least one of said plurality of headers have been loaded and prior to said associated electronic mail message being loaded;

presenting said first electronic mail message to said operator;

identifying a second one of said electronic mail messages for preloading; and preloading said second electronic mail message for later presentation, without interrupting presentation of said first electronic mail message;

wherein said step of identifying said second electronic mail message for preloading is responsive to a keyword in one of said headers associated with said second electronic mail message.

6. A method for presenting electronic mail messages to an operator, including the steps of:

loading a plurality of headers from a mail server, each one of said headers associated with an electronic mail message addressed to at least said operator, each of said plurality of headers loaded separately from its associated electronic mail message;

receiving a dynamic selection of a first one of said electronic mail messages from said operator after at least one of said plurality of headers have been loaded and prior to said associated electronic mail message being loaded;

presenting said first electronic mail message to said operator;

identifying a second one of said electronic mail messages for preloading; and preloading said second electronic mail message for later presentation, without interrupting presentation of said first electronic mail message;

wherein said step of identifying said second electronic mail message for preloading is responsive to a keyword in said second electronic mail message.

7. A method for presenting electronic mail messages to an operator, including the steps of:

loading a plurality of headers from a mail server, each one of said headers associated with an electronic mail message addressed to at least said operator, each of said plurality of headers loaded separately from its associated electronic mail message;

receiving a dynamic selection of a first one of said electronic mail messages from said operator after at least one of said plurality of headers have been loaded and prior to said associated electronic mail message being loaded;

presenting said first electronic mail message to said operator;

identifying a second one of said electronic mail messages for preloading; and preloading said second electronic mail message for later presentation, without interrupting presentation of said first electronic mail message;

wherein said step of identifying said second electronic mail message for preloading is responsive to a size of said second electronic mail message.

8. Apparatus for presenting electronic mail messages to an operator, said apparatus including:

a mail client disposed for coupling to a mail server using a communication link;

means at said mail client for loading a plurality of headers from a mail server, each one of said headers associated with an electronic mail message addressed to at least said operator, each of said plurality of headers loaded separately from its associated electronic mail message;

an input port at said mail client disposed for receiving a dynamic selection of a first one of said electronic mail messages from said operator after at least one of said plurality of headers have been loaded and prior to said associated electronic mail message being loaded;

an output port at said mail client disposed for presenting said first electronic mail message to said operator;

means at said mail client for identifying a second one of said electronic mail messages for preloading;

means at said mail client for preloading said second electronic mail message for later presentation, without interrupting presentation of said first electronic mail message;

an input element coupled to said input port; and an output element coupled to said output port;

wherein said mean for identifying said second electronic mail message for preloading is responsive to a preference designated by said operator.

9. Apparatus for presenting electronic mail messages to an operator, said apparatus including:

a mail client disposed for coupling to a mail server using a communication link;

means at said mail client for loading a plurality of headers from a mail server, each one of said headers associated with an electronic mail message addressed to at least said operator, each of said plurality of headers loaded separately from its associated electronic mail message;

an input port at said mail client disposed for receiving a dynamic selection of a first one of said electronic mail messages from said operator after at least one of said plurality of headers have been loaded and prior to said associated electronic mail message being loaded;

an output port at said mail client disposed for presenting said first electronic mail message to said operator;

means at said mail client for identifying a second one of said electronic mail messages for preloading;

means at said mail client for preloading said second electronic mail message for later presentation, without interrupting presentation of said first electronic mail message;

an input element coupled to said input port; and an output element coupled to said output port;

wherein said means for identifying said second electronic mail message for preloading is responsive to a sender of said second electronic mail message.

10. Apparatus for presenting electronic mail messages to an operator, said apparatus including:

a mail client disposed for coupling to a mail server using a communication link;

means at said mail client for loading a plurality of headers from a mail server, each one of said headers associated with an electronic mail message addressed to at least said operator, each of said plurality of headers loaded separately from its associated electronic mail message;

an input port at said mail client disposed for receiving a dynamic selection of a first one of said electronic mail messages from said operator after at least one of said plurality of headers have been loaded and prior to said associated electronic mail message being loaded;

an output port at said mail client disposed for presenting said first electronic mail message to said operator;

means at said mail client for identifying a second one of said electronic mail messages for preloading;

means at said mail client for preloading said second electronic mail message for later presentation, without interrupting presentation of said first electronic mail message;

an input element coupled to said input port; and an output element coupled to said output port;

wherein said means for identifying said second electronic mail message for preloading is responsive to a set of recipients of said second electronic mail message.

11. Apparatus for presenting electronic mail messages to an operator, said apparatus including:

a mail client disposed for coupling to a mail server using a communication link;

means at said mail client for loading a plurality of headers from a mail server, each one of said headers associated with an electronic mail message addressed to at least said operator, each of said plurality of headers loaded separately from its associated electronic mail message;

an input port at said mail client disposed for receiving a dynamic selection of a first one of said electronic mail messages from said operator after at least one of said plurality of headers have been loaded and prior to said associated electronic mail message being loaded;

an output port at said mail client disposed for presenting said first electronic mail message to said operator;

means at said mail client for identifying a second one of said electronic mail messages for preloading;

means at said mail client for preloading said second electronic mail message for later presentation, without interrupting presentation of said first electronic mail message;

an input element coupled to said input port; and an output element coupled to said output port;

wherein said means for identifying said second electronic mail message for preloading is responsive to a priority value for said second electronic mail message.

12. Apparatus for presenting electronic mail messages to an operator, said apparatus including:

a mail client disposed for coupling to a mail server using a communication link;

means at said mail client for loading a plurality of headers from a mail server, each one of said headers associated with an electronic mail message addressed to at least said operator, each of said plurality of headers loaded separately from its associated electronic mail message;

an input port at said mail client disposed for receiving a dynamic selection of a first one of said electronic mail messages from said operator after at least one of said plurality of headers have been loaded and prior to said associated electronic mail message being loaded;

an output port at said mail client disposed for presenting said first electronic mail message to said operator;

means at said mail client for identifying a second one of said electronic mail messages for preloading;

means at said mail client for preloading said second electronic mail message for later presentation, without interrupting presentation of said first electronic mail message;

an input element coupled to said input port; and an output element coupled to said output port;

wherein said means for identifying said second electronic mail message for preloading is responsive to a keyword in one of said headers associated with said second electronic mail message.

13. Apparatus for presenting electronic mail messages to an operator, said apparatus including:

a mail client disposed for coupling to a mail server using a communication link;

means at said mail client for loading a plurality of headers from a mail server, each one of said headers associated with an electronic mail message addressed to at least said operator, each of said plurality of headers loaded separately from its associated electronic mail message;

an input port at said mail client disposed for receiving a dynamic selection of a first one of said electronic mail messages from said operator after at least one of said plurality of headers have been loaded and prior to said associated electronic mail message being loaded;

an output port at said mail client disposed for presenting said first electronic mail message to said operator;

means at said mail client for identifying a second one of said electronic mail messages for preloading;

means at said mail client for preloading said second electronic mail message for later presentation, without interrupting presentation of said first electronic mail message;

an input element coupled to said input port; and an output element coupled to said output port;

wherein said means for identifying said second electronic mail message for preloading is responsive to a keyword in said second electronic mail message.

14. Apparatus for presenting electronic mail messages to an operator, said apparatus including:

a mail client disposed for coupling to a mail server using a communication link;

means at said mail client for loading a plurality of headers from a mail server, each one of said headers associated with an electronic mail message addressed to at least said operator, each of said plurality of headers loaded separately from its associated electronic mail message;

an input port at said mail client disposed for receiving a dynamic selection of a first one of said electronic mail messages from said operator after at least one of said plurality of headers have been loaded and prior to said associated electronic mail message being loaded;

an output port at said mail client disposed for presenting said first electronic mail message to said operator;

means at said mail client for identifying a second one of said electronic mail messages for preloading;

means at said mail client for preloading said second electronic mail message for later presentation, without interrupting presentation of said first electronic mail message;

an input element coupled to said input port; and an output element coupled to said output port;

wherein said means for identifying said second electronic mail message for preloading is responsive to a size of said second electronic mail message.

15. A computer program product including:

a computer usable storage medium having computer readable code embodied therein for causing a computer to present electronic mail messages to an operator, said computer readable code including:

computer readable program code configured to cause said computer to effect a mail client disposed for coupling to a mail server using a communication link;

computer readable program code configured to cause said computer to effect a header load mechanism at said mail client configured to load a plurality of headers from a mail server, each one of said headers associated with an electronic mail message addressed to at least said operator, each of said plurality of headers loaded separately from its associated electronic mail message;

computer readable program code configured to cause said computer to effect a first input mechanism at said mail client configured to receive a dynamic selection of a first one of said electronic mail messages from said operator after at least one of said plurality of headers have been loaded and prior to said associated electronic mail messages being loaded;

computer readable program code configured to cause said computer to effect a presentation mechanism configured to present said first electronic mail message to said operator;

computer readable program code configured to cause said computer to effect a selection mechanism at said mail client configured to identify a second one of said electronic mail messages for preloading; and computer readable program code configured to cause said computer to effect a download mechanism at said mail client configured to preload said second electronic mail message for later presentation, without interrupting presentation of said first electronic mail message;

wherein said selection mechanism is responsive to a preference designated by said operator, to a sender of said second electronic mail message, to a set of recipients of said second electronic mail message, to a priority value for said second electronic mail message, to a keyword in one of said headers associated with said second electronic mail message, to a keyword in said second electronic mail message, or to a size of said second electronic mail message.

16. An apparatus for presenting electronic mail messages to an operator, the apparatus including:

a mail client disposed for coupling to a mail server using a communication link;

a header load mechanism at said mail client configured to load a plurality of headers from said mail server, each one of said headers associated with an electronic mail message addressed to at least said operator, each of said plurality of headers loaded separately from its associated electronic mail message;

a first input mechanism at said mail client configured to receive a dynamic selection of a first one of said electronic mail messages from said operator after at least one of said plurality of headers have been loaded and prior to said associated electronic mail messages being loaded;

a presentation mechanism configured to present said first electronic mail message to said operator;

a selection mechanism at said mail client configured to identify a second one of said electronic mail messages for preloading; and a download mechanism at said mail client configured to preload said second electronic mail message for later presentation, without interrupting presentation of said first electronic mail message;

wherein said selection mechanism is responsive to a preference designated by said operator, to a sender of said second electronic mail message, to a set of recipients of said second electronic mail message, to a priority value for said second electronic mail message, to a keyword in one of said headers associated with said second electronic mail message, to a keyword in said second electronic mail message, or to a size of said second electronic mail message.

* * * * *